United States Patent Office 3,812,199
Patented May 21, 1974

3,812,199
DISPROPORTIONATION OF PARAFFIN
HYDROCARBONS
Nai Yuen Chen, Cherry Hill, and Stanley J. Lucki, Runnemede, N.J., assignors to Mobil Oil Corporation
No Drawing. Filed July 2, 1968, Ser. No. 741,916
Int. Cl. C07c 3/00
U.S. Cl. 260—676 R     8 Claims

ABSTRACT OF THE DISCLOSURE

Disproportionation of paraffin hydrocarbons by contacting a paraffin hydrocarbon charge under disproportionation conditions with a crystalline zeolite catalyst and separating therefrom disproportionation products comprising products having a higher molecular weight than the paraffin hydrocarbon charge and products having a lower molecular weight than the hydrocarbon charge.

BACKGROUND OF THE INVENTION

Field of the invention

This invention relates to disproportionation of paraffins employing a crystalline zeolite catalyst.

Discussion of the prior art

The term "disproportionation" as used herein refers to the conversion of a hydrocarbon into similar hydrocarbons of both higher and lower number of carbon atoms. Disproportionation has successfully been accomplished to some extent employing gaseous hydrogen fluoride. Thus, heptanes have been converted to a mixture of hexanes and octanes employing hydrogen fluoride as a catalyst according to U.S.P. 2,403,649. Disproportionation of olefins has also been effected employing an alumina catalyst containing a mixture of molybdenum oxide and cobalt oxide. Instead of employing molybdenum oxide, tungsten oxide can be employed in accordance with U.S.P. 3,330,882. Heretofore, however, disproportionation products have not been separated and recovered from disproportionation of a praffin hydrocarbon charge catalytically disproportionated over a solid catalyst such as a crystalline zeolite.

SUMMARY OF THE INVENTION

Broadly, this invention contemplates disproportionation of a paraffin hydrocarbon charge which comprises contacting said paraffin hydrocarbon charge with a catalyst comprising a catalytically active crystalline zeolite under disproportionation conditions, recovering products having molecular weights greater than and less than the molecular weight of said paraffin hydrocarbon charge.

DESCRIPTION OF PREFERRED EMBODIMENTS

In one desirable embodiment, this invention contemplates disproportionation of a paraffin hydrocarbon charge by the method which comprises contacting said paraffin hydrocarbon charge with a catalyst comprising a catalytically active crystalline zeolite catalyst under disproportionation conditions characterized by a hydrogen to hydrocarbon mole ratio of less than 0.5 and recovering therefrom products having a molecular weight greater than and less than the molecular weight of said hydrocarbon charge.

In another desirable embodiment, this invention contemplates disproportionation of a paraffin hydrocarbon charge having between 4 and 6 carbon atoms in the chain by the method which comprises contacting said hydrocarbon charge, with a catalyst comprising a catalytically active crystalline zeolite substantially free of hydrogenation activity, under disproportionation conditions characterized by a hydrogen to hydrocarbon mole ratio of less than 0.5.

Preferably, the catalyst is a porous catalytically active zeolite having a uniform pore size between 4 and 15 Angstroms, especially 6 to 15 Angstroms, and uniform interstitial dimensions and a highly ordered structure. Among these catalysts there may be mentioned especially active members which include rare earth exchanged hydrogen Linde zeolite X, hydrogen mordenite, hydrogen zeolite Y, hydrogen form of zeolite beta as described in U.S.P. 3,308,069, dealuminized mordenite prepared by acid extracting and steaming and rear earth exchanged zeolite Y prepared in accordance with U.S.P. 3,130,007. Rare earth hydrogen zeolite X can be prepared by initially preparing the sodium form of zeolite X by the method of U.S.P. 2,882,244 and by rare earth and hydrogen exchanging the sodium form in accordance with U.S.P. 3,140,253. Hydrogen mordenite can be the hydrogen form of a naturally occurring mordenite or can be the hydrogen form of a synthetic mordenite such as one presently marketed under the name Zeolon. The activity of these catalysts is influenced by the amount of residual exchangeable sodium remaining on the catalyst although even those catalysts containing a substantial amount of residual exchangeable sodium provide some disproportionation of paraffins.

In a particularly desirable embodiment, the disproportionation of the paraffin charge is effected by contacting the same with a catalyst comprising a catalytically active form of a new zeolite known as ZSM–4. ZSM–4 can be represented in terms of mole ratios of oxides as follows:

$$0.9 \pm 0.2\ M_{2/n}O:W_2O_3:3\text{–}20\ YO_2:zH_2O$$

wherein M is a cation, n is the valence of said cation, W is selected from the group consisting of aluminum and gallium, Y is selected from the group consisting of silicon and germanium, and z is from 0 to 20. In the as synthesized form, the zeolite has a formula, in terms of mole ratios of oxides as follows:

$$0.9 \pm 0.2\ M_{2/n}O:W_2O_3:3\text{–}20\ YO_2:zH_2O$$

wherein M is a mixture of tetramethylammonium cations and alkali metal cations and W, Y, n and z have the previously assigned significance. The original cations can be present so that the amount of tetramethylammonium cations is between 1 and 50 percent of the total amount of the original cations. Thus, the zeolite can be expressed by the following formula, in terms of mole ratios of oxides:

$$0.9 \pm 0.2\ [xR_2O + (1-x)M_{2/n}O]: W_2O_3:3\text{–}20\ YO_2:0\text{–}20\ H_2O$$

where W and Y have the previously assigned significance, R is tetramethylammonium, M is an alkali metal cation and x is between 0.01 and 0.50.

The original cations can be replaced, at least in part, by ion exchange with another cation. Preferably, the other cation is selected from the group consisting of alkylammonium, e.g., tetramethylammonium, arylammonium, metals, ammonium, hydrogen, thermally treated products of ammonium and/or hydrogen, or combinations of any of these cations. Particularly, preferred cations include hydrogen, rare earth metals, aluminum, metals of Groups II and VIII of the Periodic Table and manganese. Also desired are zeolites which are thermally treated products of the ammonium, hydrogen, arylammonium and/or alkylammonium cationic form, said thermal treatment consisting of heating the zeolite in the particular cation form at a temperature of at least about 700° F. In a preferred embodiment of ZSM–4, W is aluminum, Y is silicon and the silica/alumina mole ratio is at least 5 and ranges up to about 15.

Zeolite ZSM-4 can be suitably prepared by preparing a solution containing $R_2O$, sodium oxide, an oxide of aluminum or gallium, an oxide of silica or germanium, and water and having a composition, in terms of mole ratios of oxides, falling within the following ranges:

TABLE 2

|  | Broad | Preferred |
|---|---|---|
| $\dfrac{Na_2O}{R_2O+Na_2O}$ | .31-1 | .75-.99 |
| $\dfrac{R_2O+Na_2O}{YO_2}$ | .05-.90 | .15-.75 |
| $\dfrac{YO_2}{W_2O_3}$ | 3-60 | 6-30 |
| $\dfrac{H_2O}{R_2O+Na_2O}$ | 15-600 | 20-150 | wherein R is a tetramethylammonium cation, W is aluminum or gallium and Y is silicon or germanium and maintaining the mixture until crystals of the zeolite are formed. Thereafter, the crystals are separated from the liquid and recovered. ZSM-4 is preferably formed as an aluminosilicate.

In accordance with the present invention, paraffin hydrocarbon charges which can be disproportionated generally have a carbon number between 2 and 12 carbon atoms although particular advantages are provided by disproportionation of a paraffin hydrocarbon charge having a carbon number between 4 and 6. Disproportionation is generally performed at a temperature between 350 and 900° F. preferably between 400 and 650° F. under a pressure between about 0 and 3000 p.s.i.g. If the process is performed continuously, a liquid hourly space velocity, in the case of a liquid charge, between 0.01 and 10 is suitable. Generally, the LHSV is between 0.01 and 5 and more especially about 0.5.

The disproportionation can be influenced in various different ways. For instance, the presence of certain olefins such as 2-pentene tends to increase the overall conversion of the paraffin charge and to favor disproportionation over the competing isomerization reaction. On the other hand, the presence of hydrogen in the reaction system tends to surpress disproportionation and allow isomerization to be favored. Accordingly, the present invention is generally performed under conditions wherein the hydrogen to hydrocarbon mole ratio is less than 0.5. The disproportionation of a hydrocarbon charge having between 4 and 6 carbon atoms has been found to provide especially useful products in gasoline blending. For instance, when a n-pentane charge is disproportioned, the products of disproportionation include hexanes, a substantial amount of which are isohexanes. This is desirable in view of the respective octane values of pentane and isohexanes. Additionally, it eliminates the excess $C_4$ and $C_5$ hydrocarbons by converting them to gasoline products and LPG products. The butanes which result from disproportionation of pentanes can undergo subsequent disproportionation to yield LPG products and $C_5$ hydrocarbons which can be recycled to extinction.

One suitable scheme for eliminating these pentanes and butanes and converting them into hexanes and LPG consists of providing two separate reaction zones, one of which is maintained under disproportionation conditions for disproportionation of pentanes and the other of which is maintained under disproportionation conditions for butane disproportionations. Pentanes are charged into the first reaction zone and butanes are charged into the second reaction zone. Hexanes are withdrawn as disproportionation products from the first reaction zone and collected. Butanes from that reaction zone are fed into the second reaction zone together with fresh butane feed. Pentanes are withdrawn from the disproportionation effluent and recycled to the first reaction zone. Hydrocarbons lighter than butanes are collected from the disproportionation effluent from the second reaction zone as LPG products. Since the disproportionation performed pursuant to the present invention proceeds to give substantially equal amounts of products having a carbon number one greater and one less than the carbon number of the paraffins charged, the above-described process scheme is appropriate. Thus, disproportionation by the present process is characterized by the production of a minimum of lower molecular weight paraffins such as ethane.

Inorganic oxide catalysts which can be employed for disproportionation according to the present invention can be used as such or incorporated into a catalyst matrix. For instance, a porous zeolite catalyst can be incorporated in a matrix of another inorganic oxide and the composite catalyst used in the disproportionation reaction zone. Thus, the resultant catalyst will be particularly resistant to the temperatures or other conditions employed in the conversion process. Such matrix materials include inorganic materials such as clays, silica and/or metal oxides. The latter can be either naturally occurring material or in the form of gelatinous precipitates or gels including mixture of silica and metal oxides.

Inactive materials suitably serve as diluents to control the amount of conversion in a given process so that products can be obtained economically and orderly without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, function as binders for the catalyst. It is desirable to provide a catalyst having good crush strength, because, in processing, the catalyst may often be subjected to rough handling, which tends to break the catalyst down into powder-like materials which cause problems in processing. These clay binders have been employed normally only for the purpose of improving the crush strength of the catalyst.

Naturally occurring clays which can be composited with the catalyst include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate and inorganic ozide gel matrix vary widely with the crystalline aluminosilicate content ranging from about 1 to about 90 percent by weight and more usually, particularly when the composite is prepared, in the form of beads in the range of about 2 to about 50 percent by weight of the composite.

In the case of zeolite catalysts, useful in the present invention, they are normally prepared in an alkali metal form, an alkylammonium or a mixture of same and converted by ion exchange into a catalytically active form. Ion exchange of the zeolite can be accomplished conventionally, as by packing the zeolite in the form of beds, in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in as synthesized zeolite catalysts. This commercially available rare earth chloride solution contains chlorides of a rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides, but having a lower cerium content. It consists of the following rare earths determined as oxides: lanthanum 45–65 percent by weight, cerium 1–2 percent by weight, praseodymium 9–10 percent by weight, neodymium 32–33 percent by weight, samarium 5–7 percent by weight, gadolinium 3–4 percent by weight, yttrium 0.4 percent by weight, and other rare earths 1–2 percent by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations.

Base exchange with various metallic and non-metallic cations can be carried out according to the procedure described in U.S.P. 3,140,251, 3,140,252 and 3,140,253.

According to one embodiment of the present invention, a paraffin charge is contacted in a reaction zone maintained under conditions effective for disproportionation with the catalysts described above. The disproportionation products are separately recovered from any undesired products by a suitable separation method, for example, distillation. Thus, a n-pentane feed can be reacted and separated by distillation into three streams, one containing products lighter than n-pentane, e.g., propane, butanes one containing iso-pentanes and a third containing hexanes and higher molecular weight materials. If desired, a fourth recycle fraction can be taken containing predominately n-pentane. This scheme can be altered to separate the reactor effluent into a propane, butane stream, a hexane stream and a recycle stream. Similar separation schemes can be provided for other hydrocarbon charges such as butanes.

Prior to use, the catalysts are calcined at a temperature generally between 500 and 1500° F. for between 2 and 48 hours to drive off any residual moisture and to render the catalyst porous so that the paraffin charge can enter within the pores of the catalyst and come into contact with the catalytically active sites within the interior thereof.

The present invention is particularly desirable because it provides a means for disproportionating a paraffin hydrocarbon charge without the necessity of employing an impregnated catalyst or a corrosive hydrogen fluoride catalyst as used by Frey in U.S.P. 2,403,649 and 2,403,650.

In order to more fully illustrate the nature of the invention and the manner of practicing the same, the following examples are presented:

EXAMPLE 1

Disproportionation of a n-pentane charge over synthetic hydrogen mordenite was accomplished employing a 300 cc. capacity stainless steel magna drive stirring autoclave (2000 r.p.m.). The operation consisted of placing the catalyst which was freshly calcined into the autoclave and introducing into the autoclave a measured amount of the hydrocarbon. The unit was sealed and purged with gas through appropriate valving to eliminate air. The catalyst and reactants were heated with stirring in such a closed system. The conversion was monitored by taking vapor phase samples periodically. This was accomplished by bleeding out samples into an evacuated system of low volume.

Ten grams of synthetic hydrogen mordenite were charged into the reaction zone and to it were added 235 cc. of normal pentane. The autoclave was sealed and heated over a period of time at temperatures between 386 and 472° F. After 140 hours and 40 minutes, a sample of the hydrocarbon revealed that 74.3 percent of the normal pentane had been converted and that about 30 percent of the reaction products were disproportionation products. Specifically, the sample contained 1.6 weight percent propane, 10.3 weight percent isobutane, 2.1 weight percent normal butane, 25.7 weight percent normal pentane, 50.6 weight percent isopentane, 8.2 weight percent isohexanes and 1.4 weight percent normal hexane. While disproportionation products were recovered after about 20 hours reaction time, the yield appreciably increased after about 74 hours reaction time and this was accomplished by an appreciable increase in the weight percent conversion of the normal pentane.

EXAMPLE 2

Employing the general scheme and apparatus of Example 1, 10 grams of a rare earth hydrogen exchanged zeolite X containing .33 weight percent exchangeable sodium prepared by exchange of a sodium form of zeolite X with 5 percent $ReCl_3 \cdot 6H_2O$ and 2 percent $NH_4Cl$ which was thereafter freshly calcined for 23 hours at 950° F. was introduced into the autoclave subsequent to which was added 235 cubic centimeters of normal pentane. The autoclave was sealed and heated up to a temperature of about 460° F. and maintained at that temperature for 48 hours. It provided about 10 percent by weight disproportionation products, mainly isohexanes and isobutane. Some isomerization of the n-pentane also occurred.

EXAMPLE 3

A commercially available hydrogen mordenite sold under the name Zeolon was dealuminized. 24.6 grams of the hydrogen mordenite was steamed for 2 hours at 1000° F. in a 100 percent steam atmosphere. After steaming, it was contacted with 550 cc. of 2 normal HCl and held at reflux temperature of 219° F. for 4 hours. The hot catalyst was filtered and washed with deionized water until free of chloride ion. This was continued for a total of 4 cycles. The catalyst was dried for 24 hours at 230° F. The resultant silica/alumina mole ratio was 49.2.

Employing the general scheme and apparatus of Example 1, 10 grams of the dealuminized synthetic hydrogen mordenite were charged into the autoclave along with 0.2 weight percent 2-pentene. The dealuminized hydrogen mordenite had been freshly calcined for 2 hours at 960° F. prior to being introduced into the autoclave. 235 cubic centimeters of normal pentane were then charged into the reactor and it was sealed. It was heated for 24 hours at a temperature of between 456 and 466° F. After 24 hours a sample of the hydrocarbon was analyzed and found to contain isohexanes normal butane and isobutane.

EXAMPLE 4

Example 3 was repeated except that 4.8 grams of dealuminized hydrogen mordenite were employed and the hydrocarbon charge was 112 cubic centimeters of isopentane. The sealed reactor was heated for 7 hours and 15 minutes at a temperature between 455 and 461° F. About 50 percent of the conversion products were disproportionation products consisting mostly of isohexanes and isobutanes.

EXAMPLE 5

A solution, designated Solution A was prepared by mixing together 1.98 pounds sodium aluminate, 8.72 pounds sodium hydroxide and 35.55 pounds water. A second solution of colloidal silica in water (30 percent by weight silica) weighing 49.40 pounds was prepared and is designated Solution B. Both solutions were cooled, Solution A to 44° F., Solution B to 33° F. Solution A was then mixed into Solution B with rapid stirring. The resultant slurry was mixed for 30 minutes at 42° F.

The slurry was wet aged as follows:

16 hours at 47° F.
24 hours at 79° F.
24 hours at 90° F.
24 hours at 97° F.
21 days at 120° F.

700 grams of wet cake prepared by the above procedure was thereafter contacted with a solution containing 507 grams of rare earth chloride as $ReCl_3 \cdot 6H_2O$, together with 203 grams $NH_4Cl$ and 2500 milliliters water for 24 hours at 200° F. The cake was filtered and dried for 16 hours at 450° F. This was followed by exchange at 180° F. with 60 pounds of a solution consisting of 5 percent by weight $ReCl_3 \cdot 6H_2O$ and 2 percent by weight $NH_4Cl$. The cake was then water washed at 180° F. until the filtrate was substantially free of chloride ion. The catalyst was thereafter dried for 16 hours at 450° F. The catalyst analyzed 1.8 weight percent exchangeable sodium and 17.4 weight percent rare earth oxide. The catalyst was a rare earth hydrogen form of zeolite Y.

Example 3 was repeated except that the catalyst was 10 grams of the rare earth hydrogen zeolite Y prepared as above which had been freshly calcined for 2 hours at 960° F. When the autoclave was sealed, it was heated at a temperature between 455 and 461° F. After about 26 and ½ hours, a sample of the hydrocarbon was analyzed and revealed that disproportionation of the normal pentane had occurred to provide a mixture of hexanes and butanes.

EXAMPLE 6

A crystallization directing agent solution was formed by dissolving 4.59 pounds of 97.4 percent sodium hydroxide in 18.2 pounds water and adding thereto 259.2 grams of sodium aluminate and 8.18 pounds sodium silicate. Into a propeller mixer was introduced a sodium silicate aqueous solution containing 32.1 pounds sodium silicate and 15.8 pounds water. The propeller mixer was turned on at a low speed and to the sodium silicate solution was added the crystallization directing agent solution. After that solution was added, an alum solution containing 5.65 pounds $Al_2(SO_4)_3 \cdot 14H_2O$, 6.56 pounds 96.5 percent $H_2SO_4$ and 28.5 pounds $H_2O$ was added. This caused the mixture to thicken. Mixing continued with the aid of a spatula. When the mixture was mixed thoroughly, 8.42 pounds of a 24 percent by weight tetramethylammonium hydroxide in methanol solution was added until a smooth paste was formed. The product was poured into three five-gallon drums and heated with the drums open to remove the methanol. Thereafter, the drums were sealed and placed in a 100° C. steam box and heated therein until crystallization occurred. A product crystallized after 36 days. The mother liquor was decanted and the remaining precipitate was slurried with 30 gallons of water. The supernatant liquid containing colloidal silica was poured off and the precipitate was re-slurried with 40 gallons water, the supernatant liquid was decanted and the precipitate was again re-slurried with another 40 gallons water. The precipitate was thereafter filtered and dried. The composition analyzed as follows, in terms of mole ratios of oxides:

.27 $R_2O$:.72 $Na_2O$:$Al_2O_3$:12.6 $SiO_2$

It sorbed about 5.8 weight percent cyclohexane and 10.0 weight percent water. It was a ZSM-4 aluminosilicate.

It was thereafter converted to the ammonium form by four (4) successive treatments with a 10 percent by weight aqueous ammonium sulfate solution. After exchange, the product analyzed about .2 weight percent sodium.

Into the above-described apparatus was charged the ammonium exchange ZSM-4 aluminosilicate which was thereafter calcined for 64 hours at 970° F., cooled, stored, and calcined at 970° F. additionally for 2 more hours before use, thereby converting it to the hydrogen form. The catalyst was charged into the above-described apparatus containing 50 cc. of normal pentane giving a hydrocarbon density of about 0.1 gram per cubic centimeter. The product disproportionated yielding both normal and isobutanes together with normal and isohexanes. The selectivity for the disproportionation at 69.3 percent conversion of the normal pentane was the highest. At 69.3 percent the hydrocarbon constituents contained 19.0 percent disproportionation products, 53.0 percent isomerization products and 28.0 percent secondary reaction of products.

EXAMPLE 7

Employing the same catalyst used for the disproportionation reported in Example 6, isopentane was disproportionated. The hydrocarbon density in the reaction zone was about 0.5 grams per cubic centimeter. The maximum selectivity for the disproportionation occurred at the 48.4 weight percent conversion level yielding 30.1 weight percent disproportionation products, 35.4 weight percent isomerization products and 27.5 weight percent secondary reaction products.

EXAMPLE 8

Employing a hydrogen form of a ZSM-4 catalyst, an isobutane charge was isomerized and disproportionated. The hydrogen form of the ZSM-4 catalyst was prepared in the same manner as the catalyst used in Example 6.

Ninety-six grams of isobutane were charged into the above-described apparatus containing 6.5 grams of the hydrogen form of the ZSM-4 catalyst. The reactor was heated continuously up through 475° F. to 555° F. At 475° F. after 45 minutes of heating, isomerization began to occur. After 24 hours and 10 minutes of heating up to a temperature of 561° F., the composition was analyzed and found to contain 36.0 weight percent propane, 23.4 weight percent isobutane, 22.3 weight percent normal butane, 8.9 weight percent iso-pentanes, 4.5 weight percent normal pentane, 2.8 weight percent iso-hexanes and 0.7 weight percent normal hexane, indicating that a substantial amount of the isobutane charge isomerized and disproportionated to form useful hydrocarbon products and that some of the products recombined with one another to form higher molecular weight substances, notably normal and iso-hexanes.

The terms and expressions used herein have been used as terms of description and not of limitation, as there is no intention, in the use of such terms and expressions, of excluding any equivalents, or portions thereof, as various modifications and departures from the above are contemplated within the scope of the appended claims.

We claim:

1. A method for disproportionating a paraffin hydrocarbon charge having at least four carbon atoms which comprises contacting said paraffin hydrocarbon charges with a catalyst comprising dealuminized mordenite having a high silica to alumina ratio of about 49 under disproportionation conditions characterized by a hydrogen to hydrocarbon mole ratio of less than 0.5, a temperature between 350 and 900° F., a pressure between about 0 and 3000 p.s.i.g. and recovering paraffins of a molecular weight greater than and less than the molecular weight of said paraffin hydrocarbon charge.

2. A method according to claim 1 wherein said paraffin hydrocarbon charge is normal pentane.

3. A method according to claim 1 wherein said paraffin hydrocarbon charge is isopentane.

4. A method according to claim 1 wherein said products having a molecular weight greater than and less than the molecular weight of said hydrocarbon charge are separated from isomers of said paraffin hydrocarbon charge.

5. A method according to claim 1 wherein the products of the conversion are separated into three streams, one containing products lighter than said hydrocarbon charge, one containing products having the same molecular weight as said hydrocarbon charge, and a third having a greater molecular weight than said hydrocarbon charge.

6. A method according to claim 1 wherein the products of the conversion are separated into four streams, one containing products having a molecular weight less than said hydrocarbon charge, a second containing isomers of said hydrocarbon charge, a third containing products having a molecular weight greater than said hydrocarbon charge, and a fourth containing predominantly unconverted hydrocarbon charge.

7. A method according to claim 1 wherein butane is fed into a first reaction zone maintained under disproportionation conditions where said butane is converted into propane and pentanes and propane is recovered from the reaction zone effluent and the pentane from said effluent is fed into a second reaction zone maintained under disproportionation conditions where it is converted into hexanes and butanes, the hexanes being recovered from the effluent from said second reaction zone and the butanes being recycled to said first reaction zone.

8. A method according to claim 1 wherein said temperature is between 400 and 650° F. and the liquid hourly space velocity is about 0.5.

References Cited
UNITED STATES PATENTS

| | | | |
|---|---|---|---|
| 3,663,430 | 5/1972 | Morris | 208—111 |
| 3,527,835 | 9/1970 | Benesi | 260—683.65 |
| 3,280,212 | 10/1966 | Miale et al. | 260—683.65 |
| 3,301,917 | 1/1967 | Wise et al. | 260—683.65 |
| 3,516,925 | 6/1970 | Lawrence et al. | 208—111 |
| 3,446,868 | 5/1969 | Box | 260—676 |
| 3,294,858 | 12/1966 | Butler et al. | 260—683 |
| 3,391,075 | 7/1968 | Plank et al. | 208—120 |
| 3,190,939 | 6/1965 | Benesi | 260—683.65 |
| 3,250,728 | 5/1966 | Miale et al. | |

DELBERT E. GANTZ, Primary Examiner

J. M. NELSON, Assistant Examiner

U.S. Cl. X.R.

260—683 D, 683.65; 208—120